United States Patent [19]
Hoell

[11] 3,978,341
[45] Aug. 31, 1976

[54] SHORT WAVELENGTH ULTRAVIOLET IRRADIATION TREATMENT OF POLYMERIC SURFACES

[75] Inventor: Paul Clason Hoell, West Chester, Pa.

[73] Assignee: E. I. Du Pont de Nemours and Company, Wilmington, Del.

[22] Filed: Apr. 10, 1974

[21] Appl. No.: 459,709

[52] U.S. Cl. .............................. 250/492 R; 250/493; 250/504; 315/241 R
[51] Int. Cl.² .................... H05B 41/16; C08J 3/28
[58] Field of Search ........... 250/372, 492, 504, 493; 315/241 R, 349

[56] References Cited
UNITED STATES PATENTS

| | | | |
|---|---|---|---|
| 2,208,386 | 7/1940 | Null | 315/241 R X |
| 2,931,948 | 4/1960 | Forgacs | 315/241 R |
| 3,339,109 | 8/1967 | Morlais et al. | 315/241 R X |
| 3,631,319 | 12/1971 | Matthews | 315/241 R X |

*Primary Examiner*—Eugene La Roche

[57] ABSTRACT

Surface properties of an article prepared from an organic polymer are improved by a method of irradiating the surface of the article in air with ultraviolet radiation in the range of about 830 to 1335 A. Apparatus for generating ultraviolet radiation includes a capacitor, an exciting electrode which coacts with at least one of two primary electrodes to produce an arc between the primary electrodes, switching and timing means for energizing the capacitor and means for limiting current between the exciting electrode and capacitor, and a source of ac voltage.

4 Claims, 3 Drawing Figures

SHORT WAVELENGTH ULTRAVIOLET IRRADIATION TREATMENT OF POLYMERIC SURFACES

BACKGROUND OF THE INVENTION

1. Field of the Invention

This invention relates to a method for treating articles prepared from an organic polymer with ultraviolet radiation in the range of 830–1335 A, and apparatus for producing the ultraviolet radiation.

2. Description of the Prior Art

Heretofore, it was known that articles made of hydrocarbon polymers could be rendered more wettable and adhesive by treatment of the surface of the article with a spark discharge. Prior art apparatus as disclosed in U.S. Pat. No. 3,376,208 to H. H. Wood for treating such articles consisted of two spaced electrodes placed on one side of the article with a potential applied between the electrodes for producing a corona-spark discharge with the article passed through the discharge.

Other prior art apparatus such as that disclosed in British Patent No. 868,463 have irradiated organic polymer surfaces with ultraviolet radiation under 1800 A; however, bulky, expensive, vacuum or gas chambers were needed to accomplish the irradiation. In addition, quartz lamps have been used to provide ultraviolet radiation under 1800 A such as in Japanese Patent No. 16876/68, however, they have provided insufficient ultraviolet radiation. It is desirable to have an inexpensive convenient means of creating such ultraviolet radiation in air such as with discharge arcs. Apparatus for creating discharge arcs such as those disclosed in U.S. Pat. No. 3,361,930 to E. Blank and U.S. Pat. No. 3,161,752 to W. M. P. Stuart do not disclose creation of ultraviolet radiation or irradiation of organic polymer surfaces in air with ultraviolet radiation.

SUMMARY OF THE INVENTION

This invention provides apparatus for treating a shaped article prepared from a synthetic organic polymer. The apparatus comprises a means for supporting the shaped article in a radiation zone and electrical circuitry capable of producing ultraviolet radiations having a wavelength in the range of about 830 A to about 1335 A in an atmosphere of air. The electrical circuitry consists of first and second electrodes spaced apart for providing a discharge arc in the radiation zone. An electrical circuit is connected to the electrodes for providing energy pulses thereto. The circuit includes a capacitor and an energy source for repetitively energizing the capacitor. An exciting electrode adjacent the first and second electrodes for initiating the discharge may also be provided together with a means for limiting current between the exciting electrode and the capacitor to prevent the capacitor from discharging through the exciting electrode. Preferably the energy source is a transformer capable of developing a voltage across the first and second electrodes of at least 1 kv per mm of spacing. A switching and timing means are connected to the energy source to energize the transformer primary.

This invention also involves a method for improving the surface properties of a shaped article prepared from a synthetic organic polymer comprising the following steps. The article is positioned in the presence of an atmosphere of air in a radiation zone and the surface of the article is repetitively subjected to ultraviolet radiation in the range of about 830 to 1335 A for a predetermined period. The radiation is generated by a discharge arc between the first and second electrodes which are energized by a voltage of at least 1 kv per mm of spacing between the electrodes. Preferably the radiation is generated in repetitive bursts of 0.1 to about 1 second, with each burst being followed by a cooling period of about 1 to 6 seconds. The shaped article is preferably fabricated from a copolymer of 20% methyl methacrylate and 80% perfluoroalkylethylmethacrylates.

The invention also involves an article of manufacture being a shaped article prepared from a synthetic organic polymer treated by the method described hereinbefore. The organic polymer is preferably a copolymer of 20% methyl methacrylate and 80% perfluoroalkylethylmethacrylates, which may be used for preparation of a contact lens having improved wettability.

DESCRIPTION OF THE PREFERRED EMBODIMENT

Figure 1:
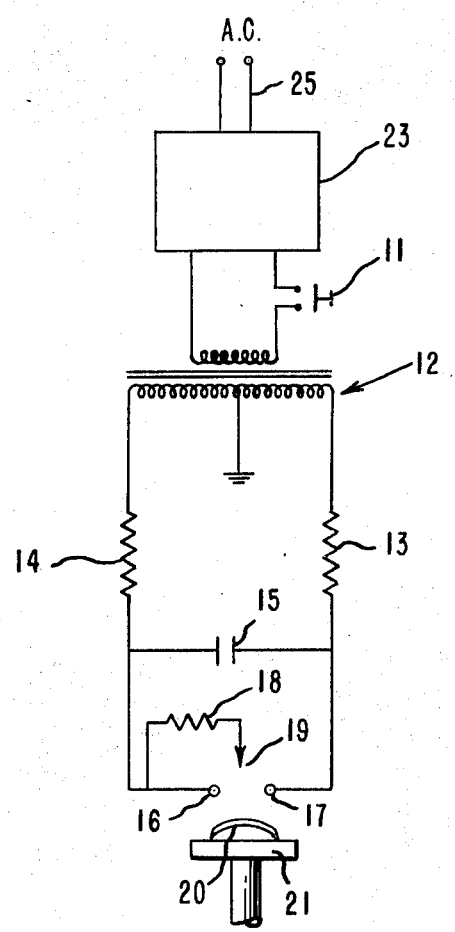
FIG. 1 is a schematic drawing of the apparatus of this invention showing a capacitive discharge circuit used to generate ultraviolet radiation.
Figure 2:
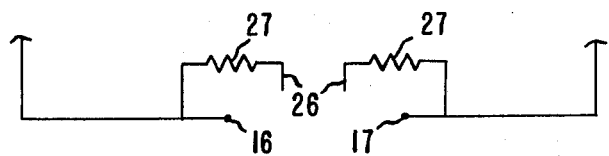
FIG. 2 is a fragmentary view of the primary electrodes of FIG. 1 with the addition of isolated transfer electrodes to each primary electrode.
Figure 3:
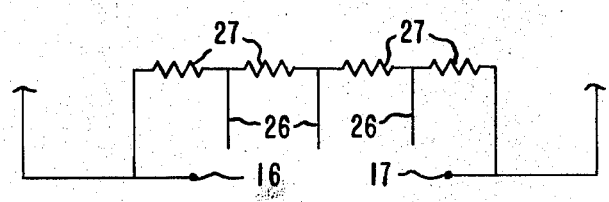
FIG. 3 is a fragmentary view of the primary electrodes of FIG. 1 with the addition of isolated transfer electrodes connected between the primary electrodes.

The preferred embodiment of the invention, illustrated in FIG. 1, is comprised of two electrodes 16, 17 constructed of a conducting material, preferably carbon discs (15 mm O.D. × 2.5 mm in thickness) which are mounted on ceramic insulators and are parallel to each other in the same plane with their opposing rounded edges separated approximately 7 mm. The separation may vary from a minimum of about 1 mm to a maximum of about 9 mm or where the discharge arc loses directionality. Above this range directionality may be improved by placing transfer electrodes along the discharge path. FIGS. 2 and 3 illustrate transfer electrodes 26 connected to one or both of electrodes 16, 17 and isolating resistors 27 of a large value above 1 M-ohm. Referring again in FIG. 1, electrodes 16, 17 are connected in parallel with a 0.002 μf., 20 kv capacitor 15, through two 50 k-ohm resistors 13, 14 in series, across the secondary winding of a typical 10 kv-rms (14 kv-peak) domestic oil burner igniter transformer 12 whose primary is energized by a 115 v., 60 hz power source 25. An adjustable exciting electrode 19 of 1 mm tungsten rod is connected through a 5.6 M-ohm resistor 18 to electrode 16 and is positioned normal to the plane of the electrodes about midway in the gap between them. Resistor 18 serves as a current limiting device to prevent the capacitor from discharging through the exciting electrode instead of through electrode 16. A timing and switching device 23 allows the supply of current to transformer 12 to be either continuous or periodic and controls the time duration of the current flow. Such timers are commercially available and common in the art. A switch 11 connects the timing and switching device 23 to the transformer primary winding.

To initiate an electrical discharge between electrodes 16 and 17, switch 11 is closed which applies an ac voltage from ac power source 25 through timing and switching device 23 to the primary of transformer 12. The first half of the ac cycle builds up a voltage across the transformer secondary and charges capacitor 15. When the voltage reaches at least 1 kv per mm of electrode spacing or preferably 8–12 kv a high voltage gradient is created between exciting electrode 19 and electrode 17. Exciting electrode 19 is adjusted so that when the capacitor has reached 8–12 kv the gradient will be sufficient to start spontaneous ionization between electrodes 16 and 17. This causes capacitor 15 to begin discharging through the ionized gas between electrodes 16 and 17 which causes further ionization and results in a rapid discharge of the capacitor. As the capacitor discharges, the voltage across the electrodes drops to a value too low to sustain continued ionization. At this point the electrical discharge is completed, and the discharge arc has produced a wide range of light frequencies including a highly intense band of ultraviolet radiation in the range of 830 to 1335 A. Only a discharge arc resulting from a voltage in excess of 1 kv per mm of electrode spacing will efficiently produce ultraviolet radiation in the range of 830 to 1335 A. The duration of the discharge arc, about 2 microseconds, is determined by the shape and spacing of the various electrodes and the physical properties of the capacitor, resistors and transformer. After ionization has taken place the capacitor will begin to recharge for the remainder of the first ac half-cycle. However, the charging current is regulated by the inductive impedance of the transformer secondary and resistors 13, 14 so that the capacitor will not charge up to a value sufficient to cause reionization thus preventing a second electrical discharge during the first ac half-cycle. In this way there is only one electrical discharge for each half-cycle of the ac voltage (i.e., 120 discharges per second).

After the first ac half-cycle is completed, the capacitor begins to charge to the opposite polarity on the next ac half-cycle. In order to prevent the premature discharge of the capacitor it is necessary that the charging rate of the capacitor be limited to a value less than the decay rate of the residual ionization. This permits the residual ionization to decay continuously until the desired 8–12 kv is reached. On the other hand, the charging rate of the capacitor must be high enough so that the capacitor potential will reach the 8–12 kv needed to initiate spontaneous ionization during the subsequent ac half-cycle. It has been found that capacitor values ranging from 0.001 $\mu f.$ to 0.02 $\mu f.$ are acceptable, with the preferred range being from 0.002 $\mu f.$ to 0.005 $\mu f.$ Although the preferred embodiment employs exciting electrode 19 to start spontaneous ionization, it may be removed and electrodes 16 and 17 positioned to create a voltage gradient sufficient to start spontaneous ionization.

The ultraviolet radiation generated by the discharge arcs passes through windows which exist in the oxygen absorption spectrum in air between 830–1335 A to irradiate the surface of an article 20 mounted on rotating support 21. The windows in the oxygen absorption spectrum are set forth in *Ultraviolet Radiation*, L. R. Keller, 2nd Ed., 1960, p. 193. The rotating support 21 positions the surface of the article parallel to and approximately 3–6 mm from the gap between electrodes 16 and 17 and slightly off center. By positioning the surface of article 20 at such a distance from the electrode gap the surface is within the radiation zone; i.e., sufficiently close to the discharge arc to avoid excessive absorption of the ultraviolet radiation by air and yet far enough away to prevent overheating by the discharge arc.

Overheating may also be prevented by administering the required total irradiation dose in a series of bursts of radiation followed by quiescent periods. A burst and quiescent period taken together are an operating cycle, with the burst, i.e., "on" time, containing a specific number of discharge arcs and the arcs discontinuing during the quiescent period, i.e., "off" time. The timing and switching device 23 controls the length of the bursts and quiescent periods. The surface of article 20 is irradiated uniformly by rotating it on rotating support 21, and treating it with about 15 operating cycles per rotation. The number of operating cycles used per rotation, 15, and the total number, normally about 15 to 45, both may vary according to the particular article treated. The article in the preferred embodiment is a contact lens prepared from an organic copolymer of 20% methylmethacrylate and 80% perfluoroalkylethylmethacrylates. Other fluorine containing polymers for use in contact lenses are disclosed in German OLS 2,228,517 hereby incorporated by reference. The optimum operating cycle for the treatment of the contact lens in the preferred embodiment is found to be about 0.25 second "on" time (about 30 arc discharges) and about 1.75 seconds "off" time. A range of values for "on" time of 0.1–1 seconds, and for "off" time of 1–6 seconds is found to be about equally effective as the optimum cycle, with the effectiveness of treatment dropping off gradually outside this range. Inside these ranges, best results are obtained when the proportion of "on" time to "off" time is in roughly the same proportion as the optimum operating cycle. For example, 0.1 seconds "on" time followed by "off" time of several seconds, which is not in the correct proportion, was not as effective as the normal operating cycle even when the accumulated exposure dose was the same. Likewise, 1 second "on" time followed by "off" time of less than 1 second were less effective than the normal cycle. Further experiments as illustrated in Example 1 show a range of values and results for the treatment of the preferred contact lens.

The effect that ultraviolet radiation of 830–1335 A has on the surface chemistry of articles prepared from organic polymers is not fully understood. Testing of irradiated surfaces by x-ray photoelectronspectroscopy (ESCA), however, has indicated that fluorine and hydrogen atoms may be replaced on the organic polymer surface. The following Examples I–IV illustrate fluorine and/or hydrogen containing organic polymer surfaces which have been treated with a resulting long-lasting (e.g. months) improvement in wettability and adhesiveness.

EXAMPLE I

A copolymer sample of 20% methylmethacrylate and 80% perfluoroalkylethylmethacrylates as described in Example I of German OLS 2,228,517 was irradiated with the electrical discharge circuit described hereinbefore with the sample placed 3.5±0.5 mm from the plane of the arc discharge. The electrodes were spaced 7 mm apart and the exciting electrode was adjusted to discharge the capacitor at 8–12 kv (variable due to electrode conditions). The number of operating cycles, "on" time and "off" time are listed below. Measurement of the contact angle was made with a horizontal, low magnification microscope equipped with a protractored eye piece. The following results were obtained:

| "on" (sec) | "off" (sec) | Number of Operating Cycles | Sample No. | $\theta_n°$ | $\theta_i°$ |
|---|---|---|---|---|---|
| .25 | .75 | 40 | 1 | 99–109.5 | 22.5–29 |
|  |  |  | 2 | 98.5–106.5 | 19–24.5 |
|  |  |  | 3 | 91–93 | 21–30.5 |
| .5 | 1.5 | 20 | 1 | 84.5–93.5 | 19–26 |
|  |  |  | 2 | 97–98.5 | 22–25 |
|  |  |  | 3 | 96–101 | 16.5–21 |
| 1.0 | 3.0 | 10 | 1 | 96–103.5 | 22–31 |
|  |  |  | 2 | 99–101 | 22–25 |
|  |  |  | 3 | 99.5–102 | 16.5–21 |

$\theta_n$ = advancing contact angle of water for non-irradiated sample.
$\theta_i$ = advancing contact angle of water for irradiated sample.

EXAMPLE II

The following polymer samples were irradiated with the electrical discharge circuit described hereinbefore. The electrodes were spaced 7 mm apart and the exciting electrode was adjusted to discharge the capacitor at 8–12 kv (variable due to the electrode conditions). Samples were placed 3.5±0.5 mm from the plane of the discharge arc and a 0.5 sec. "on" time, a 1.5 sec. "off" time and twenty operating cycles were used. The advancing contact angle was measured with a horizontal, low magnification microscope equipped with a protractored eye piece.

| Irradiated Polymer | $\theta_n$ | $\theta_i$ |
|---|---|---|
| Polyethylene terephthalate film | 57–77° | 31–37 |
| Polyvinyl chloride film | 71–91° | 20–36 |
| Lexan Polycarbonate resin derived from bisphenol A and phosgene | 73–90° | 17–32 |
| Film from paraphenylenediamine ether and pyromellitic dianhydride | 46–54° | 20–24 |
| Poly(4-methylpentene-1)film | 95–97° | 64–74 |
| Filon Glass reinforced polyester sheet | 84–93.5° | 33–36 |
| Polyamide film | 72–74° | 23.5–27 |

$\theta_n$ = advancing contact angle of water in degrees for non-irradiated sample
$\theta_i$ = advancing contact angle of water in degrees for irradiated sample

EXAMPLE III

The following polymer samples were irradiated with the electrical discharge circuit described hereinbefore. The electrodes were spaced 7 mm apart and the exciting electrode was adjusted to discharge the capacitor at 8–12 kv (variable due to electrode condition). Samples were treated with an "on" time of 0.25 sec., a quiescent period of 1.75 sec., and varying numbers of operating cycles recited below. The samples were then stored for one week at ambient conditions before the contact angles were measured with a horizontal low magnification microscope equipped with a protractored eye piece.

| Irradiated Polymer | Number of Operating Cycles | $\theta$ |
|---|---|---|
| 84/16 (by weight) tetrafluoroethylene/hexafluoropropene copolymer film | 0 | 115° |
|  | 150 | 84.7 |
| Polyimide film made from paraphenylenediamine ether and pyromellitic dianhydride | 0 | 79.3 |
|  | 15 | 69.6 |
|  | 45 | 62.0 |
| Polyethylene terephthalate film | 0 | 77.0 |
|  | 15 | 70.0 |
|  | 45 | 69.3 |
| Polyvinyl fluoride film | 0 | 77.7 |
|  | 15 | 72.5 |
|  | 45 | 63.7 |
| Polyvinyl fluoride film containing hydroxybenzophenone ultraviolet screening agent | 0 | 78.0 |
|  | 15 | 71.0 |
|  | 45 | 54.3 |
| 50/50 (mole ratio) ethylene/tetrafluoroethylene copolymer film | 0 | 93.7 |
|  | 15 | 79.0 |
|  | 45 | 66.3 |
| 80/20 acrylonitrile/styrene copolymer film | 0 | 78.0 |
|  | 15 | 81.0 |
| Polypropylene film | 0 | 99.2 |
|  | 15 | 90.3 |
| Polyethylene film | 0 | 96.5 |
|  | 15 | 77.0 |

$\theta$ = advancing contact angle of water in degrees.

EXAMPLE IV

The irradiated polymers of Example III were further tested for adhesion after a one week or more storage period. A film sample of each polymer was heat-sealed to a substrate. In addition a film sample of each polymer was heat-sealed to itself. The heat sealer, manufactured by J & A Keller Machine Co, is a Serial No. 2717 with a line pressure of 12.5 psi-185°C. (variable) and a two-second dwell. The sealer has a ¾-inch top heated bar and a ¾-inch × ⅜-inch thick bottom silicone rubber pad. Samples were sealed with the aluminum of the substrate against the bar and film against the bottom rod. The substrate was prepared by coating an ammoniated acrylic adhesive on a 22 mil flat aluminum sheet with a No. 24 drawdown rod. It was then air dried in a hood for 10 minutes, oven dried at 250°C. for one minute and then air-cooled in the hood. The substrate was cut in ½-inch strips.

The samples of the subtrate and polymer were then conditioned in either an environment of 50% relative humidity at 23°C. for 16 hours or in a wet environment of 50°C. distilled water for 16 hours.

The sample polymers were then peeled from either the substrates or from themselves by a Suter tester (0–1000 g. scale). For two-inch diameter samples it was necessary to provide a peel tape using a pressure sensitive polyester tape. This maintained a 180° peel configuration. Peel value was converted to g/in by division by the actual measured width of substrate strips (necessitated by difficulty in cutting strips exactly ½ in. wide). The following Table illustrates the values of adhesion resulting from the irradiation.

| Irradiated Polymer | Number of Operating Cycle | Seal Temp. °C | Polymer on Substrate Heat Seal 50% RH | Polymer on Substrate Heat Seal Wet | Self Heat Seal 50% RH |
|---|---|---|---|---|---|
|  |  |  | $\overline{x}$ | $\overline{x}$ | $\overline{x}$ |
| 84/16 (by weight) tetrafluoroethylene/hexafluoropropene copolymer film | 0 | 185 | 0 | — | — |
|  | 225 |  | 0 | — | — |
| Polyimide film made from paraphenylenediamine ether | 0 | 185 | 0 | — | — |
|  | 15 |  | 0 | — | 0 |

-continued

| Irradiated Polymer | Number of Operating Cycle | Seal Temp. °C | Polymer on Substrate Heat Seal | | Self Heat Seal |
|---|---|---|---|---|---|
| | | | 50% RH | Wet | 50% RH |
| and pyromellitic dianhydride | 45 | | 55 | 0 | 0 |
| Polyethylene terephthalate film | 0 | 185 | 0 | — | 0 |
| | 15 | | 560 | 0 | 580 |
| | 45 | | 620 | 170 | 920 |
| Polyvinyl fluoride film | 0 | 185 | 0 | — | 0 |
| | 15 | | 890 | 900 | 880 |
| Polyvinyl fluoride film containing hydroxy benzophenone ultraviolet screening agent | 0 | 185 | 0 | — | 400 |
| | 15 | | 900 | 760 | 1240 |
| 50/50 (mole ratio) ethylene/ tetrafluoroethylene copolymer film | 0 | 185 | 0 | — | 0 |
| | 15 | | 1360 | 1270 | 540 |
| | 45 | | 1070 | 1240 | 380 |
| 80/20 acrylonitrile/styrene copolymer film | 0 | 125 | 0 | — | 0 |
| | 15 | | 600 | 420 | 0 |
| Polypropylene film | 0 | 125 | 0 | — | 0 |
| | 15 | | 430 | 480 | 0 |
| Polyethylene film | 0 | 90 | 0 | — | 510 |
| | 15 | | 1260 | 1520 | 990 |

$\bar{x}$ = g/in Suter Peel, avg. of 3

The foregoing examples are intended to illustrate the invention and not to limit it. It will be apparent to those skilled in the art that minor adjustment of electrode spacing may be required to compensate variations in atmospheric conditions of pressure and humidity.

It will also be understood that the article to be treated should be positioned such that the arc does not pass through said article. This implies that the surface to be treated will be positioned entirely on one side of the plane common to the primary electrodes.

I claim:

1. Apparatus for applying ultraviolet radiation having a wavelength in the range of from about 830 A to about 1335 A to the surface of a shaped article prepared from an organic polymer comprising means for supporting said shaped article, first and second electrodes exposed in the atmosphere and spaced from about 1 mm to 9 mm apart and being spaced with respect to said means for supporting a shaped article such that a discharge arc between said electrodes will illuminate a shaped article supported by said means to support a shaped article; a 0.001 μf to 0.02 μf capacitor having its conductive surfaces connected with said first and second electrodes; means for charging said capacitor under a voltage of at least 1 kv per mm of spacing between said first and second electrodes.

2. The apparatus of claim 1 additionally comprising:
an exciting electrode adjacent said first and second electrode for initiating said discharge arc, and
a means for limiting current between said exciting electrode and said capacitor to prevent said capacitor from discharging through said exciting electrode.

3. The apparatus of claim 2 wherein the means for charging the capacitor is a step up high voltage transformer connected to a source of alternating current having inductively coupled primary and secondary windings, the secondary winding of which is connected to the condenser through resistors adapted to permit one discharge between the electrodes for every half cycle of alternating current.

4. Apparatus of claim 3 wherein switching and timing means are connected to said energy source to energize said transformer primary winding.

* * * * *